United States Patent
Howorka et al.

(10) Patent No.: US 7,774,260 B2
(45) Date of Patent: Aug. 10, 2010

(54) DEAL MATCHING IN AN ANONYMOUS TRADING SYSTEM

(75) Inventors: Edward R. Howorka, Morris Plains, NJ (US); Neena Jain, South Plainfield, NJ (US); Steven Iaccheo, Lincoln Park, NJ (US); Vladimir Neyman, West Orange, NJ (US); James Shu, East Hanover, NJ (US)

(73) Assignee: EBS Group Limited, London (GB)

( * ) Notice: Subject to any disclaimer, the term of this patent is extended or adjusted under 35 U.S.C. 154(b) by 2039 days.

(21) Appl. No.: 10/109,981

(22) Filed: Mar. 27, 2002

(65) Prior Publication Data

US 2002/0099647 A1 Jul. 25, 2002

Related U.S. Application Data

(63) Continuation of application No. 09/603,387, filed on Jun. 23, 2000, now abandoned.

(51) Int. Cl.
*G06F 17/60* (2006.01)

(52) U.S. Cl. .............................. 705/37; 705/36; 705/38; 705/35

(58) Field of Classification Search ............. 705/35–45; 235/375; 715/768
See application file for complete search history.

(56) References Cited

U.S. PATENT DOCUMENTS

| | | | |
|---|---|---|---|
| 3,823,387 | A | 7/1974 | McClellan |
| 4,388,489 | A | 6/1983 | Wigan et al. |
| 4,412,287 | A | 10/1983 | Braddock, III |
| 4,525,779 | A | 6/1985 | Davids et al. |
| 4,531,184 | A | 7/1985 | Wigan et al. |
| 4,554,418 | A | 11/1985 | Toy |
| 4,555,781 | A | 11/1985 | Baldry et al. |
| 4,598,367 | A | 7/1986 | DeFrancesco et al. |
| 4,623,964 | A | 11/1986 | Getz et al. |

(Continued)

FOREIGN PATENT DOCUMENTS

EP 0399850 11/1990

(Continued)

OTHER PUBLICATIONS

Antje Stobbe and Jurgen Schaaf; Alternative trading systems: a catalyst of change in securities trading; Jan. 11, 2005; web; 1-10.*

(Continued)

*Primary Examiner*—James P Trammell
*Assistant Examiner*—Marissa Liu
(74) *Attorney, Agent, or Firm*—Dickstein Shapiro LLP

(57) ABSTRACT

An anonymous trading system comprises an interconnected network of broking nodes arranged in cliques which receive buy and sell orders from trader terminals via connected trading engines and which match persistent orders, executed deals and distribute price information to trader terminals. Where two orders are matched, a proposed deal message is sent by the matching broker. If another broker has processed an event which makes the matched quote unavailable the match fails and rematch may occur. Rematch may be attempted by an intermediate broker provided it owns one side of the match, or it received both sides of the match from brokers in different cliques. The intermediate broker attempts to match with the next available quote in the queue.

2 Claims, 8 Drawing Sheets

U.S. PATENT DOCUMENTS

| | | | |
|---|---|---|---|
| 4,674,044 A | 6/1987 | Kalmus et al. | |
| 4,750,135 A | 6/1988 | Boilen | |
| 4,815,030 A | 3/1989 | Cross et al. | |
| 5,003,473 A | 3/1991 | Richards | |
| 5,034,916 A | 7/1991 | Ordish | |
| 5,077,665 A | 12/1991 | Silverman et al. | |
| 5,136,501 A | 8/1992 | Silverman et al. | |
| 5,195,031 A | 3/1993 | Ordish | |
| 5,230,048 A | 7/1993 | Moy | |
| 5,257,369 A | 10/1993 | Skeen et al. | |
| 5,267,148 A | 11/1993 | Kosaka et al. | |
| 5,270,922 A | 12/1993 | Higgins | |
| 5,287,787 A | 2/1994 | Inoue | |
| 5,375,055 A * | 12/1994 | Togher et al. | 705/37 |
| 5,508,913 A | 4/1996 | Yamamoto et al. | |
| 5,557,780 A | 9/1996 | Edwards et al. | |
| 5,557,798 A | 9/1996 | Skeen et al. | |
| 5,615,269 A | 3/1997 | Micali | |
| 5,710,889 A | 1/1998 | Clark | |
| 5,727,165 A | 3/1998 | Ordish et al. | |
| 5,787,402 A | 7/1998 | Potter et al. | |
| 5,794,210 A | 8/1998 | Goldhaber et al. | |
| 5,809,483 A | 9/1998 | Broka et al. | |
| 5,815,665 A | 9/1998 | Teper et al. | |
| 5,864,827 A | 1/1999 | Wilson | |
| 5,870,544 A | 2/1999 | Curtis | |
| 5,890,140 A | 3/1999 | Clark et al. | |
| 5,905,248 A | 5/1999 | Russell et al. | |
| 5,905,974 A | 5/1999 | Fraser et al. | |
| 5,909,545 A | 6/1999 | Frese, II et al. | |
| 5,915,209 A | 6/1999 | Lawrence | |
| 5,924,082 A | 7/1999 | Silverman et al. | |
| 5,924,083 A | 7/1999 | Silverman et al. | |
| 5,950,176 A | 9/1999 | Keiser et al. | |
| 5,966,531 A | 10/1999 | Skeen et al. | |
| 6,014,627 A * | 1/2000 | Togher et al. | 705/1 |
| 6,014,927 A * | 1/2000 | Hilford | 100/212 |
| 6,021,397 A | 2/2000 | Jones et al. | |
| 6,029,146 A | 2/2000 | Hawkins et al. | |
| 6,343,278 B1 * | 1/2002 | Jain et al. | 705/36 R |
| 7,194,481 B1 * | 3/2007 | Van Roon | 707/104.1 |
| 7,231,363 B1 * | 6/2007 | Hughes et al. | 705/37 |

FOREIGN PATENT DOCUMENTS

| | | |
|---|---|---|
| EP | 0434224 | 6/1991 |
| EP | 0485252 | 5/1992 |
| EP | 0512702 | 11/1992 |
| EP | 0798635 | 10/1997 |
| EP | 0818746 | 1/1998 |
| EP | 0893758 | 1/1999 |
| EP | 0907134 | 4/1999 |
| FR | 2543327 | 9/1984 |
| GB | 2165421 | 4/1986 |
| GB | 2180380 | 3/1987 |
| GB | 2210714 | 6/1989 |
| GB | 2282246 | 3/1995 |
| GB | 1489574 | 10/1997 |
| GB | 2325130 | 11/1998 |
| GB | 2326256 | 12/1998 |
| WO | WO 90/02382 | 3/1990 |
| WO | WO 92/07324 | 4/1992 |
| WO | WO 92/15174 | 9/1992 |
| WO | WO 93/15467 | 8/1993 |
| WO | WO 94/15294 | 7/1994 |
| WO | WO 95/06918 | 3/1995 |
| WO | WO 95/18418 | 7/1995 |
| WO | WO 95/30211 | 11/1995 |
| WO | WO 96/18963 | 6/1996 |
| WO | WO 96/34357 | 10/1996 |
| WO | WO 97/08640 | 3/1997 |
| WO | WO 97/22072 | 6/1997 |
| WO | WO 97/24833 | 7/1997 |
| WO | WO 97/31322 | 8/1997 |
| WO | WO 97/33215 | 9/1997 |
| WO | WO 97/36253 | 10/1997 |
| WO | WO 97/43727 | 11/1997 |
| WO | WO 97/45802 | 12/1997 |
| WO | WO 97/49050 | 12/1997 |
| WO | WO 98/05011 | 2/1998 |
| WO | WO 98/13796 | 4/1998 |
| WO | WO 98/21667 | 5/1998 |
| WO | WO 98/24041 | 6/1998 |
| WO | WO 98/26344 | 6/1998 |
| WO | WO 98/26363 | 6/1998 |
| WO | WO 98/36456 | 8/1998 |
| WO | WO 98/38558 | 9/1998 |
| WO | WO 98/47268 | 10/1998 |
| WO | WO 98/49635 | 11/1998 |
| WO | WO 98/49639 | 11/1998 |
| WO | WO 98/53581 | 11/1998 |
| WO | WO 99/01983 | 1/1999 |
| WO | WO 99/08419 | 2/1999 |
| WO | WO 99/10795 | 3/1999 |
| WO | WO 99/10815 | 3/1999 |
| WO | WO 99/14695 | 3/1999 |
| WO | WO 99/19821 | 4/1999 |
| WO | WO 99/27477 | 6/1999 |
| WO | WO 99/33242 | 7/1999 |
| WO | WO 99/35583 | 7/1999 |
| WO | WO 99/36875 | 7/1999 |
| WO | WO 99/40502 | 8/1999 |
| WO | WO 99/41690 | 8/1999 |
| WO | WO 99/50771 | 10/1999 |

OTHER PUBLICATIONS

Mini Computer Forum, Conference Proceedings, 1975.
Wall Street Computer Review, 1998.
Computers in the City, Conference Proceedings, 1988.
Banking Technology, 1988, vol. 5, No. 5.
U.K. Search Report issued Feb. 19, 2001 (in English).

* cited by examiner

DEAL MATCHING IN AN ANONYMOUS TRADING SYSTEM

This application is a continuation of application Ser. No. 09/603,387 filed Jun. 23, 2000 now abandoned; which is incorporated herein by reference.

TECHNICAL FIELD

The present invention relates to a computer trading system for providing an electronic broking service for tradable instruments such as spot FX and other financial instruments including but not limited to FRA's interest rate swaps, money markets, options, metals, call money, government bonds and other short term interest rate instruments. In particular, the invention relates to a computer trading system having a plurality of trader terminals connected to a network for submission and matching of bids, offers, buy and sell orders.

BACKGROUND TO THE INVENTION

An anonymous trading system is known, for example, in EP-A-0,399,850, EP-A-0,406,026 and EP-A-0,411,748 which disclose an automated matching system for anonymous trading of foreign currencies (or other financial instruments). In this system, a single host computer maintains a central database of all trading instruments available for trade, credit information and bids and offers which have been submitted by terminals connected to the host via a computer network. The host computer uses information in its central database to match bids and offers and buy and sell orders based on matching criteria which include a counter party credit limit.

The counter party credit limits are set at each trading floor, and are stored at the host computer, which then establishes a gross counter party credit limit for each possible pair of counter-parties. The gross counter party credit limit is the minimum amount of the remaining credit from a first party to a second party, and the second party to the first party. The various trader terminals connected to the host computer maintain and display only a restricted subset of the information available at the host computer, such as best bids and offers.

A problem was identified with this system in that the host computer only used the credit information to check that a deal could proceed after a potential match had been identified. A trader thus could not know whether he had credit with a potential counter party prior to attempting to trade. This problem was identified and a solution provided in the system disclosed in U.S. Pat. No. 5,375,055.

In the system disclosed in U.S. Pat. No. 5,375,055 a credit matrix is derived and stored at a plurality of regional nodes of a distributed network, with each regional node distributing market information to a set of trader terminals to which the regional node is connected via an access node. The regional node is known as a Market Distributor and provides dealable price information to the trader terminals connected via the access node known as a Market Access Node. The actual matching of bids, offers, buy and sell commands is provided by separate nodes known as Arbitrators.

We have further appreciated, however, that there are problems with having a single matching computer. Traders using a host computer trading system are often in geographically separate locations which leads to varying delays in message flow from the traders to the host computer. The result is that a trader in one geographical location may be disadvantaged in terms of the time delay of messages to the host in comparison to another trader. As an example, if two traders in physically separate locations simultaneously submit an order, the trader's message which arrives at the host computer first will match with a quote before the second. This can provide an advantage to the trader geographically close to the host, and is frustrating for the trader further away. Moreover, the trader further away may receive a message reporting that a match has not succeeded, increasing message traffic on the network.

To improve this situation, the more distributed system disclosed in U.S. Pat. No. 5,375,055 has matching engines at separate physical locations, thereby increasing parity between traders in different locations and reducing network traffic. In that system, as with the host system, a trader hitting a price (a taker) could be physically distant from the trader quoting the price (the maker). Whilst network traffic is reduced, there is still the possibility that two traders could hit a price near simultaneously, but that one taker trader will ultimately fail to make a deal with a particular maker because the message from the other taker trader arrived first.

We have appreciated that a distributed system can advantageously be arranged to increase matching.

SUMMARY OF THE INVENTION

The invention provides a computer trading system for trading financial instruments comprising: a first broker node, a second broker node and at least one intermediate matching node connected between the first and second broker nodes, each broker node performing a broking function the nodes together comprising a distributed network; and a plurality of trader terminals connected to the distributed network wherein each of the nodes comprises: a store of quotes available for trading; and a matching facility for matching compatible quotes and orders submitted by each of the plurality of trading agents, wherein the intermediate matching node includes: means for intercepting a message requesting a deal which has been transmitted from the first broker node to the second broker node; means for detecting that the deal proposed by the first broker node will fail; and means for proposing an alternative match with a quote from the store of quotes available for trading.

An intermediate node need not be a broker node as there is no requirement for the intermediate node to provide the broking function of providing market views to traders. Nonetheless, the network is preferably arranged such that any intermediate node is also a broker node. This provides flexibility of deployment in that the distributed network simply comprises one type of node, the broker nodes, and allows any newly connected trader to connect to any chosen node which can provide a broking function.

The quote chosen for the rematch should be the second quote in the store of quotes to provide fairness.

To avoid the possibility that more than one intermediate node might try and perform a rematch, which would cause contention, the intermediate node only proposes a rematch if it is the owner of at least one side of the match. The owner of an order is the broker node first receiving that order from a trader. This prevents more than one rematch occurring.

A chosen structure for the distributed network is to have the nodes arranged in cliques, in which case the intermediate node only proposes a rematch if it received the information for both sides of the match from nodes in different cliques.

BRIEF DESCRIPTION OF THE DRAWINGS

An embodiment of the invention will now be described, by way of example only, and with reference to the accompanying figures in which.

DESCRIPTION OF A PREFERRED EMBODIMENT

The purpose of the embodying system is to allow traders to enter quotes and orders which are then matched within the system. The system provides a platform for trading at least the following instruments: FX Spot, FRA, and Forwards and also FX Forwards, CFDs, short-dated government and/or central bank paper, commercial bills, CDs, inter-bank deposits, commercial paper, reports, interest-rate futures, swaps, options and a miscellany of tailor-made variants on these basic products. These are all referred to as financial instruments.

Figure 1:
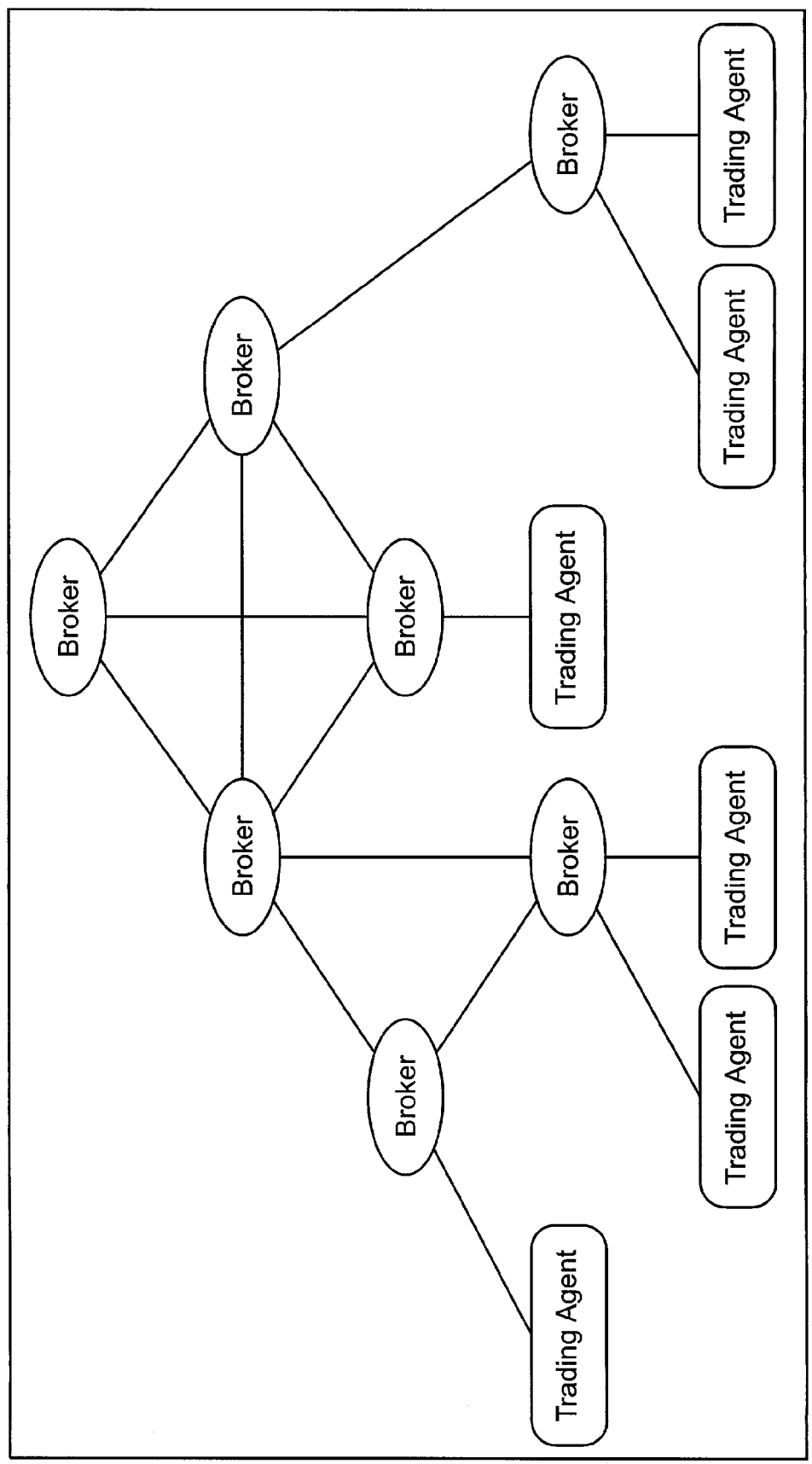
FIG. 1: is an overview of a trading system embodying the invention.

Traders at trader terminals submit quotes and hits which are then passed on to each of a plurality of broker nodes throughout the system. A quote is a bid or offer order submitted by a trader to "make a market" and is distributed to other traders as part of a market view. Quotes are thus orders visible to other traders. A hit is a buy or sell submitted by a trader wishing to create a deal on the basis of a price displayed on his market view derived from one or more quotes. Hits are orders which are invisible to other traders. The computer trading system of FIG. 1 comprises a plurality of trading agents 10 each connected to at least one of a plurality of broker nodes 12. Each trading agent is the means by which the trader terminals access the trading system.

Trader terminals (not shown) may be workstations or other computer terminals configured to submit quotes and orders (usually through use of a specialized key pad) and to display market view data, including price and amount available, for financial instruments to be traded. Traders are typically grouped as part of a financial institution, such as a bank, which arranges traders as part of a trading floor. A trading floor is a group of traders under common control of a trading floor administrator who allocates credit lines for the trading floor against other trading floors. The market view for a trader, or group of traders, is the market information (price, volume, etc.) that the traders can see that reflect the market. The market views are preferably pre-screened for credit compatibility.

The embodying system is preferably an anonymous trading system in which the market views produced by the brokers comprise price and amount information without identifying the source of the price. The prices displayed for available bids and offers and the amounts available at those prices, are thus aggregates of one or more quotes. Only the quotes of parties satisfying the pre-screen credit criteria are included in the aggregate price displayed. The market views produced by the broker nodes thus differ from one trading floor to another depending on the credit allocation.

The trading agent node provides services to a specific trading floor or group of traders. These services include providing access to the network for each trading work station, completing deals, producing deal tickets and maintaining historical dealing information for traders. Each trading agent node must connect to at least one broker node to access the trading system. A group of trader terminals thus connects to a trading agent 10 to access the system.

Each Broker node 12 provides the basic order matching and price distribution services. The Broker nodes are arranged in a structure called a Clique Tree which enables faster communications routing, following very specific but simple rules. The Clique Tree is a network structure where individual nodes are grouped into Cliques, and the Cliques are then arranged into a tree structure. Each Broker can be linked logically to a number of Brokers, which are referred to as its neighbor Brokers. Communication between Brokers is on an equal level, with no "up" or "down" direction in the network.

While Trading Agents must be connected to at least one Broker node, they themselves are not members of the Clique Tree, but remain outside the structure. A Trading Agent connected to multiple Broker nodes will receive multiple sets of market prices. Even though the price information from different Broker nodes can be substantially the same, the information may be received at different intervals. A Trading Agent will send a given trading order to only one Broker node.

The term Broker node is used to describe a computer arranged as a physical or logical node in a computer network providing a broking function. The basic broking function is the storing of quotes, providing the quotes to traders in the form of a market view and matching quotes and orders. The Broker nodes in the described embodiment also perform further functions, but these are not essential features of what is defined as a Broker node.

The Broker nodes are equal to each other, and perform the same functions. The arrangement of the network or their position in it is transparent to the broker nodes. They only need to know about their neighbors. Each Broker node has: knowledge of all orders in the market, and is able to match orders as soon as they are submitted. As a consequence of the fact that each Broker node maintains a full list of orders in the market, it is therefore able to customize market views as needed by the Trading Agents and is able to react faster to market information as soon as it is received.

Figure 2:
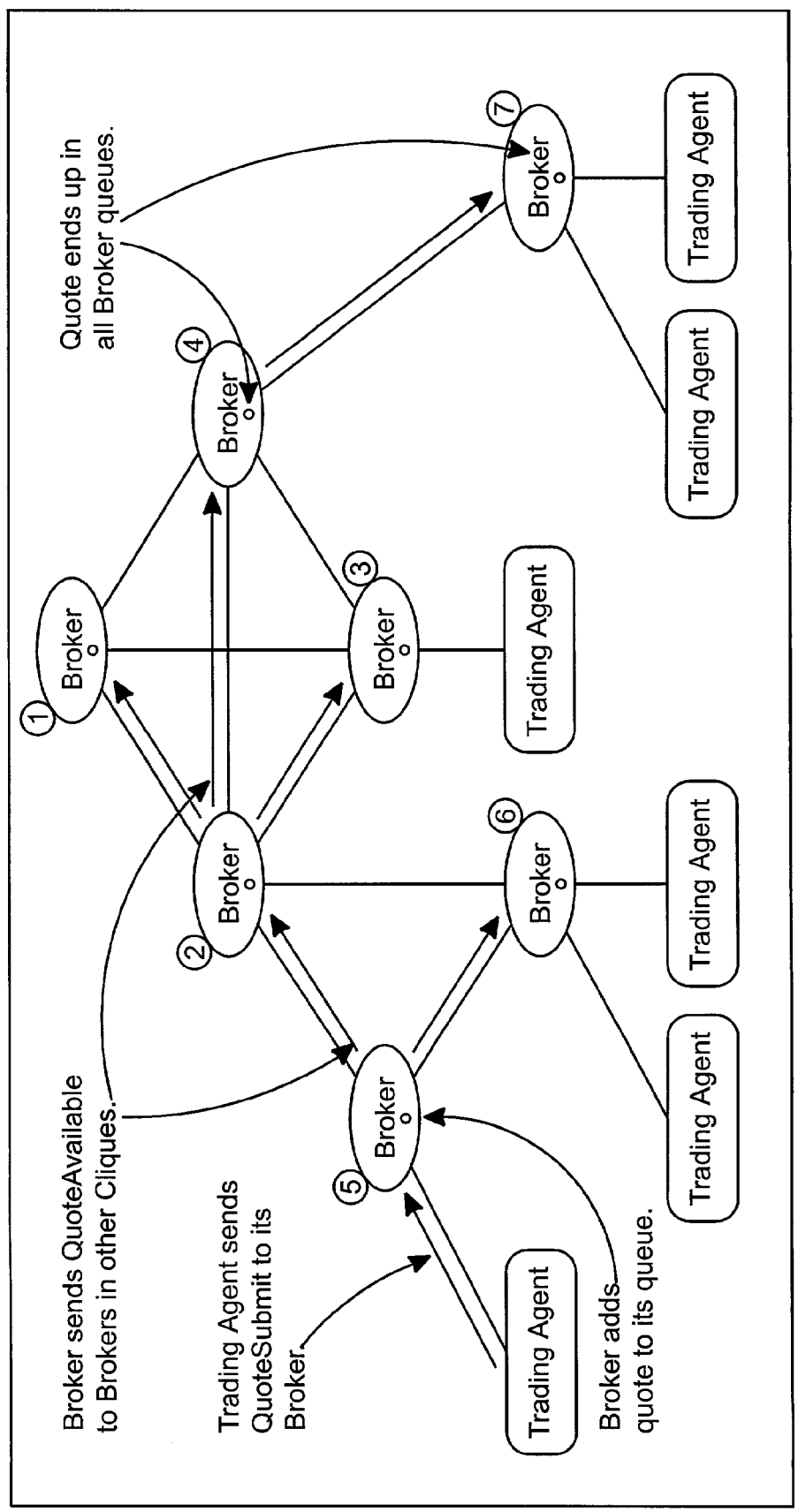
FIG. 2: shows the flow of messages when a new quote is submitted in the system.

To understand the purpose of the distributed broker node arrangement, price distribution and deal execution will now be described with reference to FIG. 2.

The deal process begins with one or more traders submitting orders into trader terminals. An order is a dealing request from a trader, with instructions to buy or sell with specific restrictions, such as price and amount. A quote is a persistent order that remains available in the system and is distributed as part of the market price information. Quotes are used to "make the market", and are known to traders as bids or offers. A hit is an order that has the "invisible" and "fill or kill" properties. Hits are not distributed as part of the market price. A hit does not remain in the system; if it can not be dealt when entered, it is removed.

An Order Book is a list of all the available orders in the market. Since the Quotes are the only available orders, the book consists of a list of Quotes. The Quotes are arranged in a queue in the correct dealing order. The sort order of the queue may vary for different trading instruments. The default sort order is by price and time. In the system, each Broker node maintains a complete list of all available quotes.

The message flow in the system is described by named messages, each carrying appropriate parameters throughout the network. The process of submitting a quote (persistent order) begins when a Trading Agent receives information from a trader workstation that a trader has issued a bid or offer. The Trading Agent then starts the quote submission process. When the Trading Agent receives the quote information from the trader workstation, it will create and maintain a context for the quote. It will then send a Quote Submit message to the Broker node that it is connected to. The Broker node will validate the quote and accept it if valid. This first Broker node that receives the quote becomes the "owner" Broker node for this quote. In example shown in FIG. 2 this is Broker node 5. This is the only Broker node that can commit the quote to a deal. The Broker node will create a context or "quote object" and sort it into its queue for the correct tradable instrument.

After the quote is placed into its queue, the owner Broker node will then distribute the quote throughout the network by sending QuoteAvailable messages to other Broker nodes. In this example, Broker node 5 sends the QuoteAvailable message to Broker nodes 2 and 6. As each Broker node receives the message, it creates a context (quote object) and sorts it into its queue (order book). It notes in the context which Broker node had sent it the message. After placing it into the queue, the Broker node then sends the QuoteAvailable message on, using broadcast routing rules, to all neighbors in other cliques. Therefore, Broker node 2 sends it to 1, 3 and 4. Broker node 4 then sends it to Broker node 7. At this point, all Broker nodes know about the quote, and update their order books accordingly.

The broadcast routing rules are applied to ensure that network traffic is handled in an efficient manner and to reduce any duplication of message flow.

The broadcast rules are:
1. The Broker node originating information will send it to all of its neighbour Broker nodes.
2. A Broker node receiving the information will send it to all of its neighbours Broker nodes except those in the same clique as the Broker node that sent the information.
3. If a message contains persistent information, such as a quote, the information will be stored with the identifier of the Broker node from which the information was received.

Note that these rules refer to the information, not the message that contains it. For example, information about a quote may be sent to one Broker node in a ProposeDeal message and to another Broker node in a MarketUpdate message. However, the same information is sent to both Broker nodes, and so that above rules apply.

Figure 3:
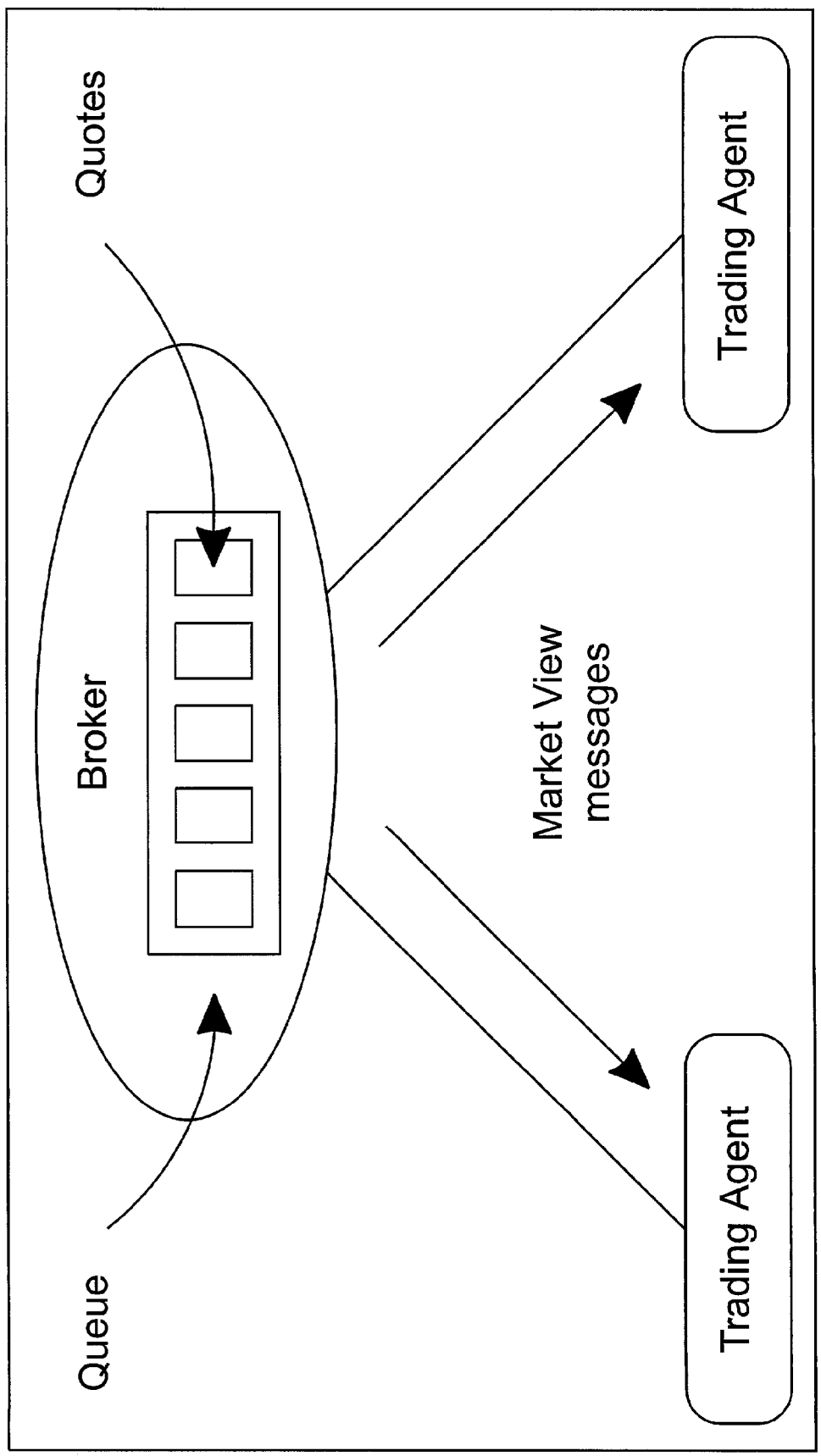
FIG. 3: depicts the production of a market view to traders.

Price distribution is the process of providing market information to the traders at the trader terminals. This information is created by the Brokers nodes and sent to by the Trading Agents for distribution to the traders. This process is shown in FIG. 3.

Each Broker node will examine its queue of quotes (order book) and calculate a view of the market for each Trading Agent connected to it. This view is built specifically for the trading floor that the agent represents. Views may be different based on credit or other factors. The exact process for determining a market view will vary based on the trading instrument. The view information is sent to the Trading Agent in a MarketView message.

Figure 4:
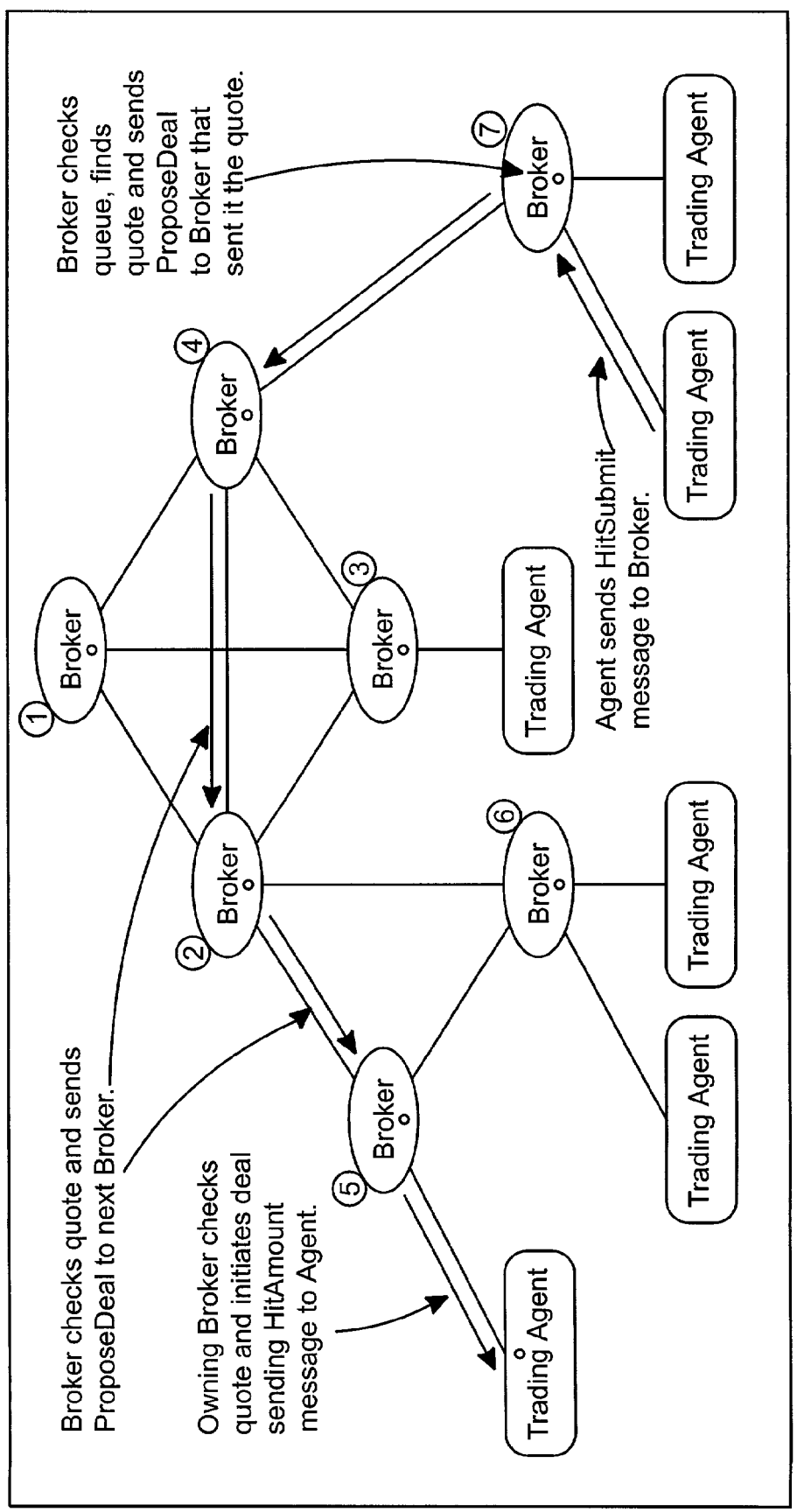
FIG. 4: shows the flow of messages when a trader submits a buy or sell order.

Hitting a quote is the basic process of creating a deal between two traders. A hit from one trader is matched to a quote from another trader. This process is shown in the FIG. 4. The Trading Agent of the trader terminal hitting a price shown on his market view display sends a HitSubmit message to the Broker node. This message targets a price, not a specific quote. The Broker node will scan its queue and find the first quote in the queue that can be matched with the hit. The matching rules may vary based on the trading instrument.

When the hit is matched to a quote, the Broker node will modify its context for the quote, moving the amount matched from "available" to "reserved pending deal". This will prevent the same amount of the quote to be matched with another hit. The Broker node will then send a ProposeDeal message to the Broker node from which it received the quote. This message will target the specific quote. In this example, Broker 7 will sent the message to Broker 4.

As each Broker node receives the ProposeDeal message, it checks the quote in its queue. If the amount of the ProposedDeal is still available in the queue, the Broker node performs a similar process as the matching Broker node. The amount of the ProposedDeal is moved from "available" to "reserved pending deal". The ProposeDeal message is then sent to the Broker node from which it received the quote. In the example, Broker node 4 sends it to Broker node 2. Broker node 2 will then send it to Broker node 5.

The routing of a ProposeDeal message follows targeted routing rules. Targeted routing is used to deliver information to a specific Broker node. Since knowledge of specific Broker nodes is not built into the system, the target is not a specific Broker node, but is the Broker node from which the information originated. For example, a message is not sent to "Broker node 714", but is sent as to "the Broker node originating quote 42". The targeted rules are:
1. A Broker node originating a message about a specific piece of information, will send the message to the Broker node from which it received the original information.
2. A Broker node receiving a message about a specific piece of information that it did not originate, will send the message to the Broker node from which it received the original information.

The message will thus follow the path of the original information back to its source. In the example this is from Broker node 7, to Broker node 5, via Broker nodes 2 and 4 direct.

Fly When the Broker node that originally created the quote receives the ProposeDeal message, it performs the same checks and amount reservation as the other brokers. Since this Broker node owns the quote, it has the authority to commit the quote to a deal. The ProposeDeal message represents the authority to commit the hit to the deal. The Broker node will then initiate the deal process by sending a HitAmount message to the Trading Agent that submitted the quote. The deal execution process is described later.

Figure 5:
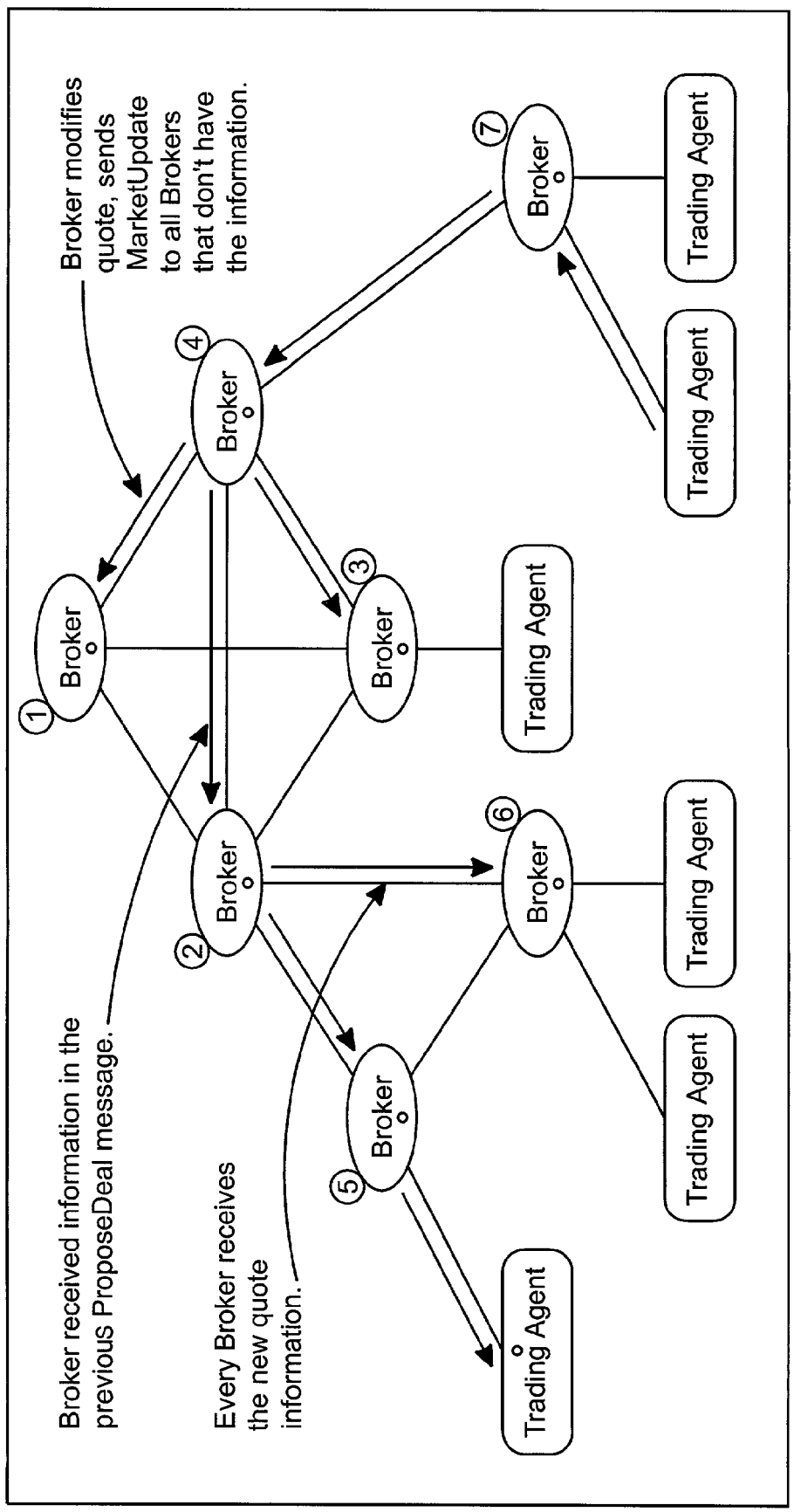
FIG. 5: shows the flow of messages to update broker nodes following a buy or sell order.

As the deal matching process takes place, it is necessary that the list of quotes maintained at each Broker node be keep up to date. This is accomplished by each Broker node notifying others when it makes a change to a quote, as shown in FIG. 5.

As each Broker node changes a quote in its queue, it notifies all neighbor Broker nodes except those in the clique from which it received the change. In the example above, Broker node 4 received notice of a change in a quote from Broker node 7 in a ProposeDeal message. It notifies Broker node 2 by sending the ProposeDeal message. Broker node 4 must now notify Broker nodes 1 and 3. This is done by sending a MarketUpdate message to these Broker nodes.

Following the normal routing rules, the information about the quote is distributed to each Broker node in the network. Any Broker node receiving the MarketUpdate message will pass it to all neighbors not in the clique from which it is received. Note that a Broker node sending a ProposeDeal message should not also send a MarketUpdate message to the same Broker node. This would result in duplicate information being received and the deal amount being reserved twice.

Figure 6:
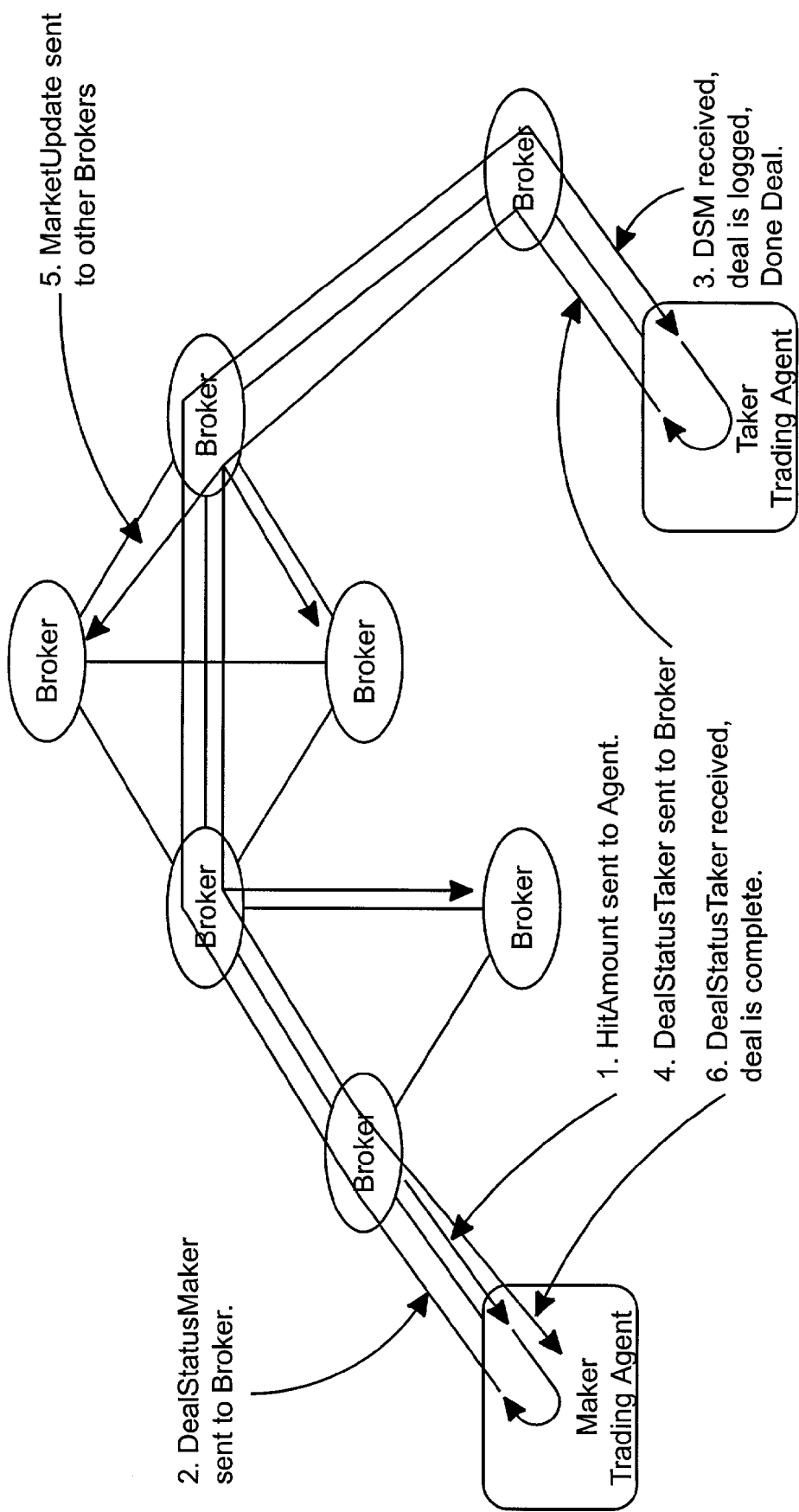
FIG. 6: shows the deal execution process.

The deal execution process itself is not central to the present invention, but will now be described for completeness. When the deal matching process is completed, as described above, the deal execution process begins. This process completes the deal and commits the traders to a deal. The process is shown in FIG. 6. As matches are made and deals initiated, information is made available for traders. This information can be used to inform a trader that a deal is pending. Any given trading application can decide if the trader should be informed. In any case, the information is available.

The Taker's Trading Agent will be notified as soon as the initial match is made and the ProposeDeal message is sent. This agent can notify the traders workstation at this time. This pending deal information may change as the matching process continues. The maker workstation is notified of the pending deal when the maker's Trading Agent checks credit and sends the DealStatusMaker message.

The deal execution process begins when the maker's Trading Agent receives a HitAmount message from its Broker node. This message informs the Agent that a match was made for one of its quotes. The message identifies the quote as well as the amount of the hit, counterparty and the identity of the hit. The Agent will check with the trader workstation to make sure that the quote is still available. The Agent will send a HitAmountWS message to the workstation. The workstation will reply with a HitAmountWK message to show that the workstation is still working and that the trader did not interrupt the quote. At this point, the trader can no longer interrupt the deal.

The Trading Agent will next check for available credit with the counterparty. The credit check may allow the deal, reduce the amount of the deal or disallow the deal. The Agent will then reduce the available credit by the amount needed for the deal. This reduction in available credit may affect future deals. The maker's Trading Agent will now inform the taker's Trading Agent of the deal by sending a DealStatusMaker message to its Broker node. The message is targeted to the identity of the hit. The network Broker nodes will route the message to the owner Broker node of the hit, and that Broker node will deliver it to the taker's Agent. Once this message is sent, the maker's Agent knows that a deal may have been done, but the deal is in doubt pending a reply. The taker's Trading Agent completes the deal execution process. This part of the process takes place when the Agent receives the DealStatusMaker message from the maker. If the message shows a valid deal, the process continues.

The taker's Trading Agent will next check for available credit with the counterparty in a similar manner as the maker. The credit check may allow the deal, reduce the amount of the deal or disallow the deal. The Agent will then reduce the available credit by the amount needed for the deal. This reduction in available credit may affect future deals. The taker's Trading Agent will now log the deal to its disk. As soon as the information is committed to persistent storage, the deal is done. Any checks on the deal status will now show a binding deal. The agent will now notify the trader, print a deal ticket and perform any other post deal processing. At this point, the deal is done but the maker doesn't know yet. As soon as the deal is done, the taker's Trading Agent will notify the maker by sending a DealStatusTaker message to its Broker node. This message is targeted to the quote and will be routed to the maker's Agent.

The DealStatusTaker message contains final information about the deal, and therefore the final changes to the quote. This information is used by the network Broker nodes and the Trading Agent. As the DealStatusTaker message is routed through the Broker nodes, each routing Broker node will use the information to update its quote context. The amount of the deal is moved from "reserved" to "complete". The portion not done is moved from "reserved" to "available" if the quote is still active. It will then notify other Broker nodes of the changes and of the deal by sending a MarketUpdate message to all other Broker nodes using network routing rules.

When the DealStatusTaker message gets to the owner Broker node of the quote, it will send it to the Trading Agent. The Agent will record the deal to disk. At this point the deal is no longer in doubt. The Agent will notify the trader, print a ticket and perform any other processing that is required. Some trading instruments may require additional information to be exchanged for a deal. An example of this is the settlement instructions for EBS spot F/X. This type of information is sent in a DealInformation message. After the deal is processed, the Agents can develop this information. The DealInformation message is sent to the Broker node. The network Broker nodes will then route the message to the other Agent where the information is processed as required by the instrument. A deal is thus completed.

Figure 7:
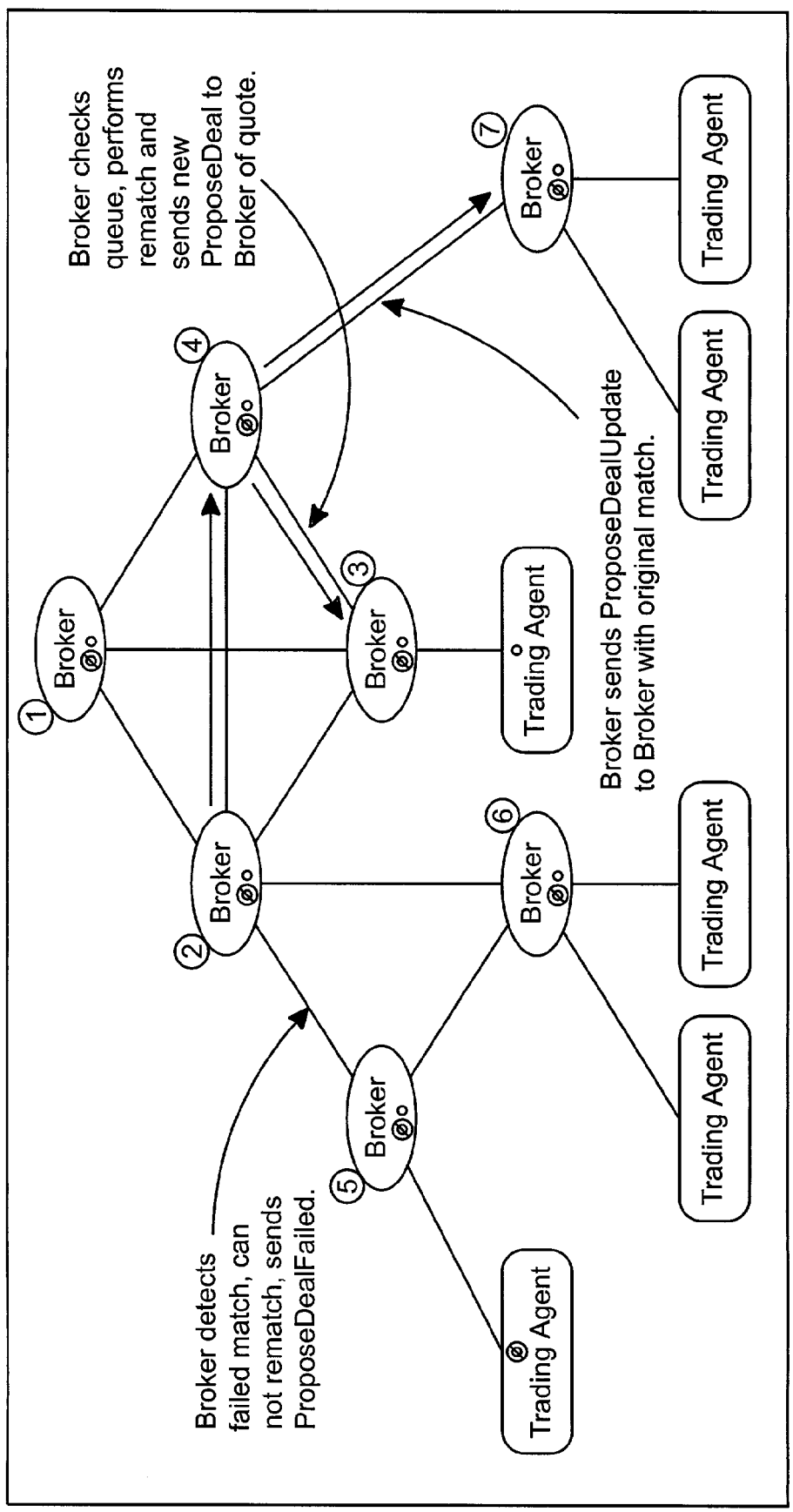
FIG. 7: shows detection of a failed match at an intermediate node.

The rematch process will now be described with reference to FIGS. 7 and 8. As previously described, the matching Broker node creates a match based on its own queue. However, changes in the quote could be in process. Therefore, the quote being matched may not be available at the owning Broker node. The architecture allows for detection and rematch in an efficient manner.

In this example, a second quote has been submitted from an Agent connected to Broker node 3 for the same price as the original quote. This new quote has been distributed and is in each Broker node's queue in second place.

A failed match is likely to occur when two or more conflicting events happen at about the same time. This is common when a good price is entered and many traders try to hit it at once. The first hit causes the price to be taken from the market and later hits fail.

In the example above, Broker node 7 performs a match and sends the ProposeDeal message. At the same time, Broker node 5 processes an event that makes the quote unavailable. It sends a MarketUpdate message. These messages come together at Broker node 2.

When a Broker node receives a ProposeDeal message for a quote that is not suitable for the match, a failed match situation occurs. If no rematch takes place, the Broker node would send a ProposeDealFail message back to the Broker node from which it received the ProposeDeal message. The architecture allows for this to happen at the first point where the information is known. This provides for efficient processing.

In this example, Broker node 2 first receives and processes the MarketUpdate message. This causes the first quote to be marked as unavailable. It then receives the ProposeDeal message. When processing the message, it determines that the quote can not be matched to this hit. The ProposeDeal then fails. Since the ProposeDeal message represents a commitment on the part of the matching Broker node, the failing Broker node can rematch the deal if possible. Allowing rematch at the intermediate Broker node prevents network chasing and provides for efficient matching. This can be done by the Broker node that first detects the failure, or by another Broker node in the path back to the Broker node that made the initial match.

The rematch process follows these rules:
1. Rematch is only done with the next available quote on the priority queue.
2. Rematch can be done by a Broker node only if it is the owner of at least one side of the match, (hit or quote) OR 3. Rematch can be done by a Broker node if it received both sides of the match from Brokers in different cliques.

The rules are arranged this way for the following reasons. The initial order submitted to the taker's broker node represents a commitment on the part of the taker to do a deal. The authority to match a quote to the order is therefore passed with the ProposeDeal message through the network. The ProposeDeal message is passed from one intermediate node to another and so the authority to match and rematch is also passed on. It is important that no Broker nodes other than the Broker node passing the ProposeDeal message are given the authority to perform a rematch, as this could lead to duplicate matching and would increase message flow within the network to resolve the conflict.

The rules thus ensure that at any one time, only one Broker node has authority to attempt a rematch, and that unnecessary duplication of messages does not occur. If these rules are met, the Broker node can initiate the rematch process. If not, then the match fails.

In this case, the ProposeDealFail message is sent. In the example, Broker node 2 determines that the original match has failed. It checks its queue and sees that the hit in the ProposeDeal can match the second quote in the queue. It received the second quote from Broker node 3. It received the hit in the ProposeDeal message from Broker node 4. Since Broker nodes 3 and 4 are in the same clique, the rules are not satisfied and Broker node 2 does not have authority to perform a rematch. A ProposeDealFail message is sent to Broker node 4.

If the rule were not followed and Broker node 2 had performed a rematch, a ProposeDeal message would be sent from Broker node 2 to Broker node 3 and MarketUpdate messages would be sent to other Brokers in the clique. As a result, however, Broker node 3 has been notified of the match by Broker node 2 and will subsequently send deal completion messages back to Broker node 7 via Broker node 2. As a result, there is now an extra path in the routing of subsequent information using the normal routing rules. This is prevented by the third rule.

If the rematch rules are met, the Broker will perform a rematch. First, the Broker will modify its context for the quote (quote object) moving the amount of the match from "available" to "reserve pending deal". It will then send a ProposeDeal message to the Broker from which it received the quote. This message will reference the hit from the original ProposeDeal message. The Broker will also send a ProposeDealUpdate message to the Broker from which it received the original ProposeDeal message.

In the example above, Broker node 4 receives the ProposeDealFail message. It checks the queue and is able to rematch with the second quote. It then sends a ProposeDeal message to Broker node 3 to notify it of the hit. It also sends a ProposeDealUpdate message to Broker node 7 to notify it of the change in the match for the hit.

During the rematch process, it is important that all the Broker nodes in the network know about all the changes in the quotes. A failed match or rematch results in changes to the status of quote that must be distributed to other Broker nodes. The notification process requires careful routing control to avoid the easy possibility of missed or duplicate notification. There are several situations that require notification. Each must be handled in a consistent and reliable manner. The different notification types are:

1. For the failed deal, unwinding the quote reservations back along the path to the original matching Broker node.

2. For the new deal, notifying Broker nodes back along the path to the original matching Broker of the quote reservation.
3. For the new deal, notifying Broker nodes forward along the path to the new owning Broker node about the quote reservation.
4. For both deals, notifying Broker nodes in cliques that are not on the deal path.

Figure 8:
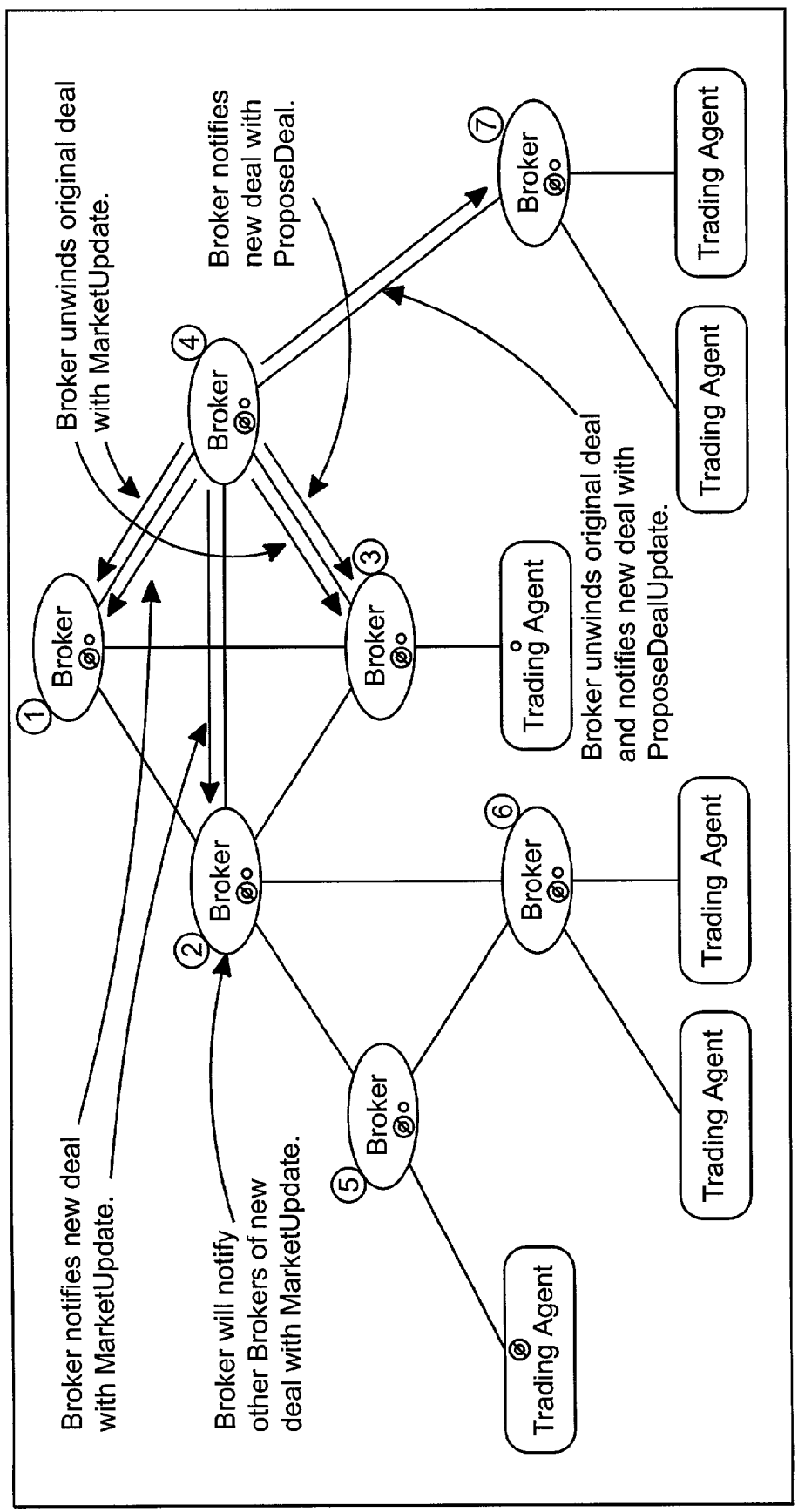
FIG. 8: shows market update distribution following a rematch.

Part of this process is shown in FIG. 8. This shows the notification made by Broker node 4 in the previous example. When a Broker node makes a change that unwinds a change made by another Broker node, it follows two simple rules:

1. Notify the Broker node that sent the original information that is being changed.
2. Notify any Broker nodes that would have been notified by use of the original information.

In this way, the network routing rules are followed from the perspective of the original information flow. The rules do not seem to apply if looked at from the perspective of the unwinding change. This consistency is required to avoid duplicate notification or missed notification.

In the previous example, Broker node 2 receives notice of a quote change from Broker node 4 in a ProposeDeal message. It then fails the match which unwinds the quote change. It notifies the originator of the information, Broker node 4, by sending the ProposeDealFail message. Since Broker node 2 did not notify any other Brokers of the original quote change, it does not send any additional notifications.

Broker node 4 receives the ProposeDealFail message. This causes it to unwind its original quote change. Since it received the original information from Broker node 7, it notifies that Broker. Since it sent the original information to Broker nodes 1 and 3, it sends the new information to these Brokers in a MarketUpdate message.

The second part of a rematch creates a new quote change. This new information is distributed in the same way as the unwind. For the distribution forward on the path to the owning Broker node of the quote, the normal matching rules apply. Each Broker node sends the information to the source of the quote in a ProposeDeal message. It sends it to other Broker nodes in the same clique or to uninvolved cliques in a MarketUpdate message. The process is slightly different for sending the information back on the path to the original matching Broker node. The information is sent to the Broker node which sent the original ProposeDeal message in a ProposeDealUpdate message. No messages are sent to other Broker nodes in this same clique, they will be notified by the Broker node receiving the information. For all Broker nodes in cliques that are not on the path of the deal, normal rules apply. These will be notified of both changes by MarketUpdate messages. These brokers do not even know that a given change unwinds another.

The invention claimed is:

1. A node in a computer trading system, the node including computer executable software for performing the steps of:
receiving notifications regarding at least a first quote from a first node and a second quote from a second node;
storing the first quote and the second quote in a store of orders;
receiving a notification regarding a hit from a third node for the first quote;

receiving a notification that the first quote is no longer available and that the hit did not match with the first quote because the first quote is no longer available; and matching the hit with the second quote in the store of orders.

2. The node as recited in claim 1, wherein the nodes are broker nodes.

* * * * *